US007483930B1

(12) United States Patent
Wright et al.

(10) Patent No.: US 7,483,930 B1
(45) Date of Patent: Jan. 27, 2009

(54) METHOD AND APPARATUS FOR MAINTAINING AN OBJECT-BASED WRITE BARRIER TO FACILITATE GARBAGE-COLLECTION OPERATIONS

(75) Inventors: Gregory M. Wright, Mountain View, CA (US); Matthew L. Seidl, Longmont, CO (US); Mario I. Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 775 days.

(21) Appl. No.: 10/903,169

(22) Filed: Jul. 29, 2004

(51) Int. Cl.
*G06F 17/30* (2006.01)
*G06F 12/00* (2006.01)

(52) U.S. Cl. .................. 707/206; 707/200; 707/103 R; 707/104.1; 711/144

(58) Field of Classification Search ................. 707/206, 707/200, 103, 104; 711/100, 170, 144, 145
See application file for complete search history.

(56) References Cited

U.S. PATENT DOCUMENTS

| | | | | |
|---|---|---|---|---|
| 5,845,298 A | * | 12/1998 | O'Connor et al. | 707/206 |
| 5,848,423 A | * | 12/1998 | Ebrahim et al. | 707/206 |
| 6,421,689 B1 | * | 7/2002 | Benson et al. | 707/206 |
| 6,598,141 B1 | * | 7/2003 | Dussud et al. | 711/170 |
| 6,804,762 B1 | * | 10/2004 | Dussud et al. | 711/170 |
| 6,865,657 B1 | * | 3/2005 | Traversat et al. | 711/170 |
| 6,931,504 B2 | * | 8/2005 | Wolczko et al. | 711/165 |
| 6,944,637 B2 | * | 9/2005 | Darnell | 707/206 |

FOREIGN PATENT DOCUMENTS

WO  WO 01/44947 A1 * 6/2001

* cited by examiner

*Primary Examiner*—Cam-Linh Nguyen
(74) *Attorney, Agent, or Firm*—Park, Vaughan & Fleming LLP (57) ABSTRACT

One embodiment of the present invention provides a system that facilitates identifying roots for a garbage-collection operation in a computer system that supports an object-addressed memory hierarchy. In order to identify roots, the system first looks up an object table entry that corresponds to an object in an object cache, wherein the object table entry contains an evicted bit, which is set when any part of the modified object is evicted from the object cache, and a corresponding physical address for the object in main memory. Next, the system determines if the evicted bit is set in the object table entry, and if so, examines the object corresponding to the object table entry to determine if the object contains references to the target area in the object heap that is being garbage collected. If so, the system uses the references as roots for a subsequent garbage-collection operation of the target area.

27 Claims, 5 Drawing Sheets

METHOD AND APPARATUS FOR MAINTAINING AN OBJECT-BASED WRITE BARRIER TO FACILITATE GARBAGE-COLLECTION OPERATIONS

BACKGROUND

1. Field of the Invention

The present invention relates to the design of computer systems that support objects defined within an object-oriented programming system. More specifically, the present invention relates to a method and an apparatus for maintaining an object-based write barrier to facilitate garbage collection operations in a computer system that provides an object-addressed memory hierarchy.

2. Related Art

As object-oriented programming languages become more widely used, computer systems are being designed to manipulate objects more efficiently. Along with manipulating objects, computer systems also manipulate ancillary structures associated with objects. For example, each object in an object-oriented programming system is typically associated with an object table entry that contains metadata associated with the object, such as the object's physical address (if the object has one).

Computer systems that support objects also maintain various structures to support garbage collection operations to reclaim objects that are no longer being used. In order to support generational garbage collection, the object heap is often partitioned into two or more partitions. Furthermore, the computer system typically maintains a write barrier between partitions to facilitate garbage-collection operations on a given partition. To accomplish this, some computer systems use a card table to keep track of modified values in other partitions that may potentially point to objects in a target partition being collected. In these computer systems, each partition can be divided up into equal-sized areas referred to as "cards." Each time a portion of an object is modified within a card, a corresponding entry for the card is marked in the card table. Thus, during subsequent garbage collection operations, the system scans the card table looking for entries that are marked. If such an entry is found, the system scans the object in the corresponding memory card to identify references to the target area being collected. These references are used as "roots" for a subsequent garbage-collection operation.

While this method of maintaining a write barrier between partitions is effective, it has a rather high overhead. Each store to the object heap involves performing a corresponding store to mark the corresponding card table entry. Hence, each store operation becomes two stores. Furthermore, since bit operations can be rather time-consuming, the card table typically uses bytes or words rather than bits to represent cards. Consequently, the card table can take up a lot of space. Moreover, scanning the card table takes linear time, therefore increasing the size of the card table linearly increases the scanning time. This can become problematic as the heap becomes increasingly large.

Hence what is needed is a method and an apparatus for maintaining an object-based write barrier to facilitate garbage-collection operations without the problems described above.

SUMMARY

One embodiment of the present invention provides a system that facilitates identifying roots for a garbage-collection operation in a computer system that supports an object-addressed memory hierarchy. In order to identify roots, the system first looks up an object table entry that corresponds to an object in an object cache, wherein the object table entry contains an evicted bit, which is set when any part of the modified object is evicted from the object cache, and a corresponding physical address for the object in main memory. Next, the system determines if the evicted bit is set in the object table entry, and if so, examines the object corresponding to the object table entry to determine if the object contains references to the target area in the object heap that is being garbage collected. If so, the system uses the references as roots for a subsequent garbage-collection operation of the target area.

In a variation on this embodiment, prior to the garbage-collection operation, the system receives a request at a translator to evict an object cache line owned by a processor, wherein the object cache line includes at least a portion of the object. In response to the request, the system retrieves the object table entry associated with the object from a translation cache and stores the object cache line at a location determined from the physical address in the object table entry. Additionally, the system sets the evicted bit in the object table entry and may later evict the object table entry from the translation cache.

In a variation on this embodiment, the object table entry is located within an object table object that is part of a hierarchical object table. Moreover, each object table object in the hierarchical object table has a corresponding object table entry in a higher-level object table object until a root object table is eventually reached, whereby the hierarchical object table forms a tree-structure.

In a further variation, looking up the object table entry involves looking up the object table entry in the hierarchical object table which is tree-structured.

In a variation on this embodiment, if the evicted bit is set and the object does not contain references to the target area that is being garbage collected, the system clears the evicted bit. However, if the evicted bit is set and the object does contain references to the target area, the system leaves the evicted bit set.

In a variation on this embodiment, prior to identifying roots for the garbage-collection operation, the system flushes the object cache and the translation cache to ensure that evicted bits are properly set.

In a variation on this embodiment, prior to identifying roots for the garbage-collection operation, the system scans the object cache to locate owned (i.e. modified) objects in an area in the object heap that is not being garbage collected and that have a clear evicted bit. The system then sets the evicted bit for such owned objects.

In a further variation, setting the evicted bit involves setting each corresponding evicted bit moving up a hierarchical object table tree-structure until an evicted bit is already set, or until a root object table is reached.

In a variation on this embodiment, the system scans the object cache for owned objects in an area of the object heap that is not being garbage collected and that have a clear evicted bit. Next, the system determines if any owned object contains one or more references to the target area that is being garbage collected. If so, the system sets the evicted bit for the owned object, and immediately uses the one or more references as roots for a garbage-collection operation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and does not include computer instruction signals embodied in a transmission medium (with or without a carrier wave upon which the signals are modulated).

Computer System

Figure 1:
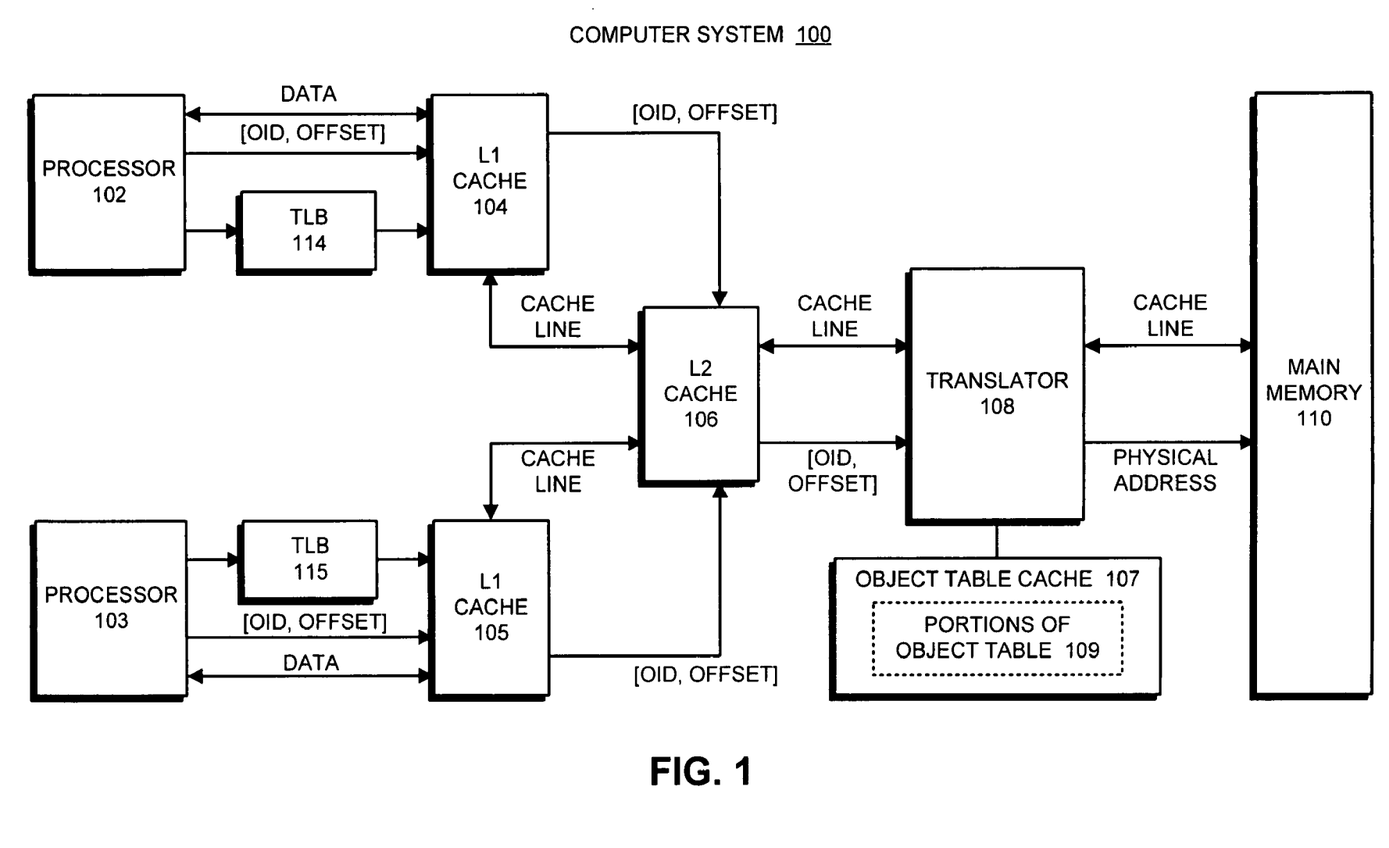
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 1, computer system 100 includes processors 102 and 103. Processors 102 and 103 access code and data from L1 caches 104 and 105, respectively. Note that L1 caches 104 and 105 can include unified instruction/data caches, or alternatively, separate instruction and data caches.

Processors 102 and 103 are associated with translation lookaside buffers (TLBs) 114 and 115, which facilitate translating virtual addresses into physical addresses for non-object references.

L1 cache 104 and L1 cache 105 make use of an extended address encoding procedure that enables L1 cache 104 to function as both a conventional cache and an object cache. For example, during a conventional load operation, a virtual address is sent from processor 102 to TLB 114. TLB 114 translates the virtual address into a physical address, which is subsequently used by L1 cache 104.

In contrast, during a load operation involving a portion of an object, processor 102 obtains the corresponding object identifier (OID) and offset and combines them to create an object address. This object address is embedded into an unused portion of the physical address space to produce an encoded address. Note that the higher order bits of this encoded address are different than the higher order bits of any physical address. This allows the system to distinguish an encoded address from a physical address. When the encoded address is subsequently sent from processor 102 to L1 cache 104, the encoded address bypasses TLB 114 and directly enters L1 cache 104. Note that only minor modifications are required to conventional cache designs in order to provide object caching using the above-described technique.

In order to request a non-object data item, such as a value from a normal virtual address, processor 102 generates a virtual address that is sent to TLB 114. TLB 114 translates this virtual address into a physical address, which is sent to L1 cache 104.

Note that after an object address is translated into an encoded address L1 cache 104, L1 cache 105 and L2 cache 106 can treat the encoded address in the same manner as a normal physical address.

If a given data item (or instruction) is not located within L1 cache 104 or L1 cache 105, it is retrieved from L2 cache 106. If it is not located within L2 cache 106, it is pulled into L2 cache 106 from main memory 110.

Unlike in a conventional memory hierarchy, a translator 108 is interposed between L2 cache 106 and main memory 110. Translator 108 converts an object address, comprising an object ID and an offset, into a corresponding physical address, which is sent to main memory 110.

If an object is not present within L2 cache 106, the encoded address is forwarded to translator 108. Translator 108 uses an object table 109 to translate the encoded address into a corresponding physical address. Note that object table 109 is a software data structure that is resident in main memory 110. Portions of object table 109 are cached in object table cache 107 to improve the performance of translator 108. Each entry in object table 109 associates a given object ID with a corresponding physical address in main memory where the object resides.

When a cache miss for an object occurs in L2 cache 106, translator 108 intercepts the encoded address and extracts the object ID. Next, translator 108 uses the object ID to index into object table 109 obtain a corresponding base physical address. Once the base physical address is obtained, translator 108 converts the load request for the object into a load request for a physical address in main memory 110.

The system uses the base physical address and the offset to locate a specific cache line (or cache lines) in main memory 110. Fetching circuitry within translator 108 directs the normal load hardware to issue a load instruction to main memory 110. This fetching circuitry subsequently receives the cache line corresponding to the physical address. The fetching circuitry then forwards the cache line to L2 cache 106.

Object cache lines differ from conventional physical cache lines because object cache lines can start on arbitrary word boundaries, whereas physical cache lines are delineated by larger power-of-two address boundaries. Hence, physical cache lines and object cache lines may not always align. For example, a physical cache line with a length of 64 bytes typically starts at a physical address that is a multiple of 64. Objects, however, may start on any physical address which is a multiple of four in a 32-bit system. Thus, a 64-byte object cache line starting at address 44 includes addresses (44 . . . 107). This overlaps with physical cache lines (0 . . . 63) and (64 . . . 127). In this case, the object is split across two physical cache lines. Hence, two load operations are required to retrieve the entire object cache line. Once both physical cache lines have been retrieved, the portions of the cache lines containing the object cache line, (44 . . . 63) and (64 . . . 107), are concatenated together to form the object cache line (44 . . . 107). Other portions of the physical cache lines are discarded.

In the event of an eviction from L2 cache 106, translator 108 converts the encoded address containing the object ID and the offset into a physical address. The fetching circuitry subsequently uses the physical address to generate one or more store operations to store the evicted cache line in main memory 110.

Note that processors 102 and 103 are configured to handle the extended address encoding procedure described above. In one embodiment of the present invention, a platform-independent virtual machine, such as a Java Virtual Machine, is modified to generate requests for portions of an object using an object ID and an offset. Moreover, in one embodiment of the present invention, processors 102 and 103 are configured to execute special instructions for performing load and store operations involving an object ID and an offset—in addition to normal load and store instructions that use virtual addresses.

Although the present invention is described with reference to a computer system 100 with two levels of cache, the present invention can generally be used with any single-level or multi-level caching structure. Furthermore, although computer system 100 includes two processors, the present invention can generally be used with any number of processors.

Object Table

Figure 2:
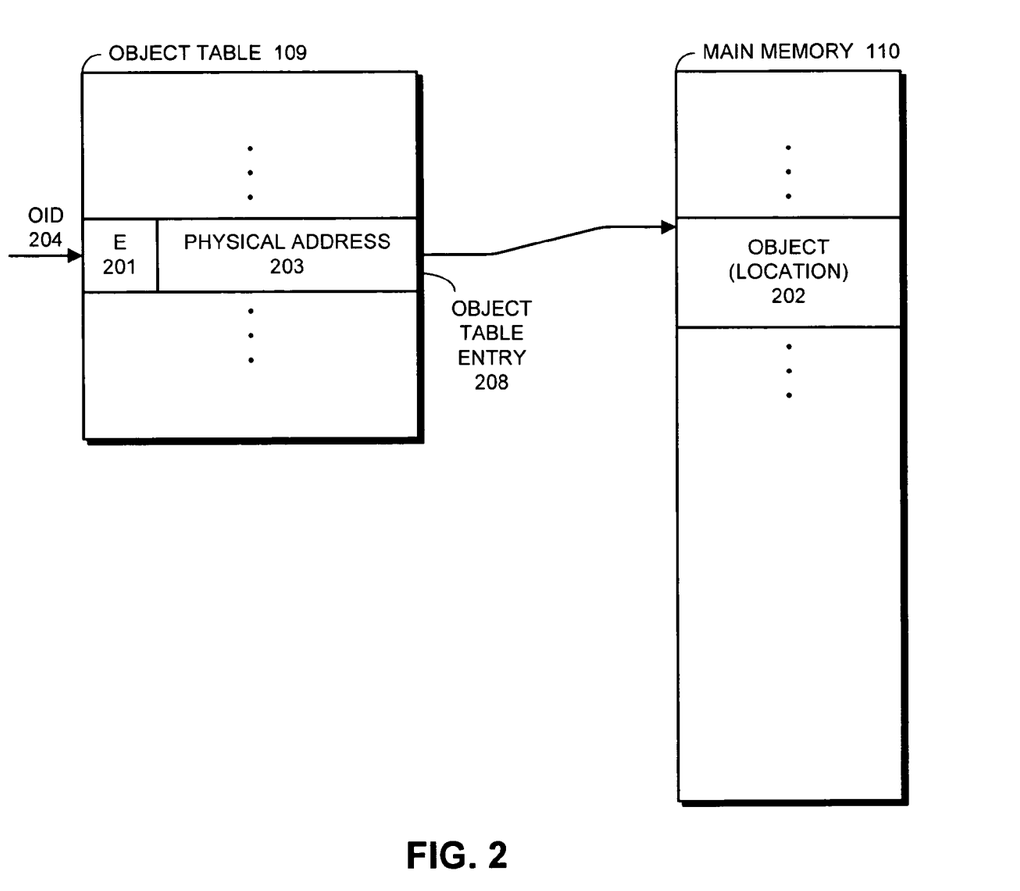
FIG. 2 illustrates an object-addressed memory hierarchy in accordance with an embodiment of the present invention.

FIG. 2 illustrates an object-addressed memory hierarchy in accordance with an embodiment of the present invention. In order to manipulate an object, the system manipulates ancillary data structures associated with the object. For example, in one embodiment of the present invention, each object defined within an object-oriented programming system is associated with an object table entry 208 that contains metadata associated with the object, such as the object's physical address 203, and an evicted bit 201, which indicates whether any part of the corresponding object has been evicted from cache, and hence, is modified in main memory 110.

An object can be accessed by using an object identifier (OID) 204 to reference an object table entry (OTE) 208 for the object from object table 109. (Note that object table 109 can itself be implemented as one or more objects. Moreover, object table 109 is a software data structure that is resident in main memory 110.) The physical address 203 for the object is then retrieved from object table entry 208. This physical address 203 is used to access the object from its location 202 in main memory 110.

Object Table Hierarchy

Figure 3:
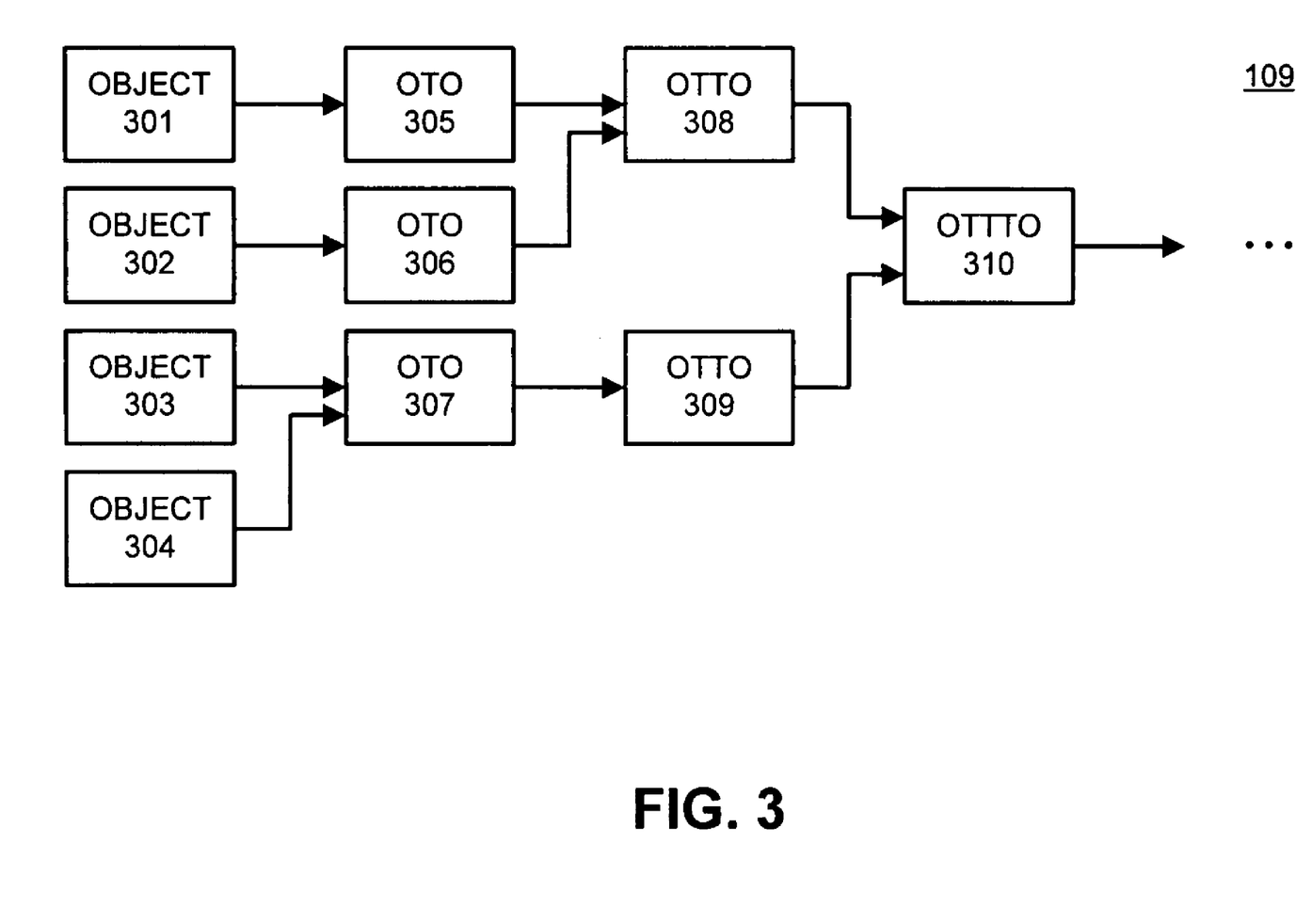
FIG. 3 illustrates an object table hierarchy in accordance with an embodiment of the present invention.

FIG. 3 illustrates the hierarchical structure of object table 109. Object table 109 includes a number of objects 301-304, which have corresponding object table entries in object table objects (OTOs) 305-307. Object table objects 305-307 have corresponding object table entries in object table table objects (OTTOs) 308-309. Object table table objects 308-309 have corresponding object table entries in object table table table object (OTTTO) 310. Note that although this example illustrates three levels of object tables, the present invention can generally be applied to object tables with fewer levels or more levels.

Note that there exists a mapping function that maps objects to corresponding object table objects. Moreover, this same mapping function also maps object table objects to higher-level object table objects.

Process of Setting Evicted Bit

Figure 4:
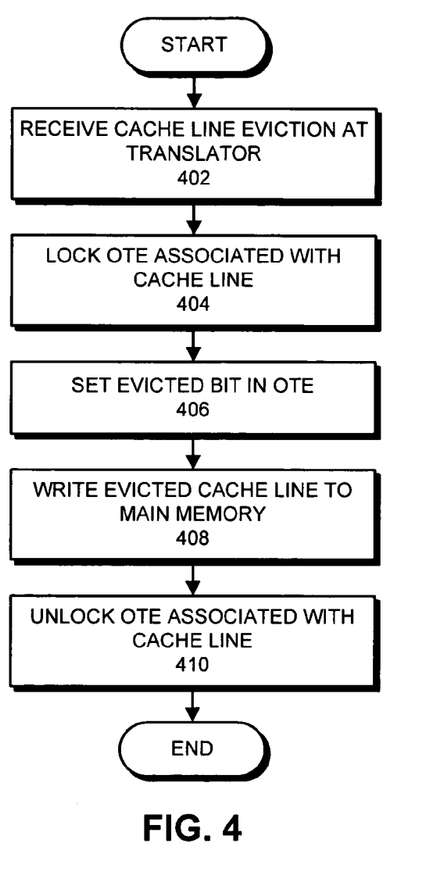
FIG. 4 presents a flow chart illustrating the process of setting an evicted bit during a cache line eviction in accordance with an embodiment of the present invention.

FIG. 4 presents a flow chart illustrating the process of setting evicted bit 201 during a cache line eviction in accordance with an embodiment of the present invention. Note that in the computer system illustrated in FIG. 1, main memory 110 is updated during a cache line eviction operation or a cache flush operation that causes an object cache line to be flushed out to main memory 110.

During this cache line eviction operation, translator 108 causes an evicted bit to be set in an object table entry corresponding to the object. This can take place as follows. First, the system receives a cache line eviction operation at translator 108 (step 402). Next, the system locks the object table entry 208 associated with the object, so that it cannot be modified by another process or processor (step 404). The system then sets the evicted bit 201 in object table entry 208 (step 406), and then writes the evicted cache line out to main memory 110 (step 408). The system then unlocks the object table entry associated with the cache line (step 410).

Performing a Garbage-Collection Operation

Figure 5:
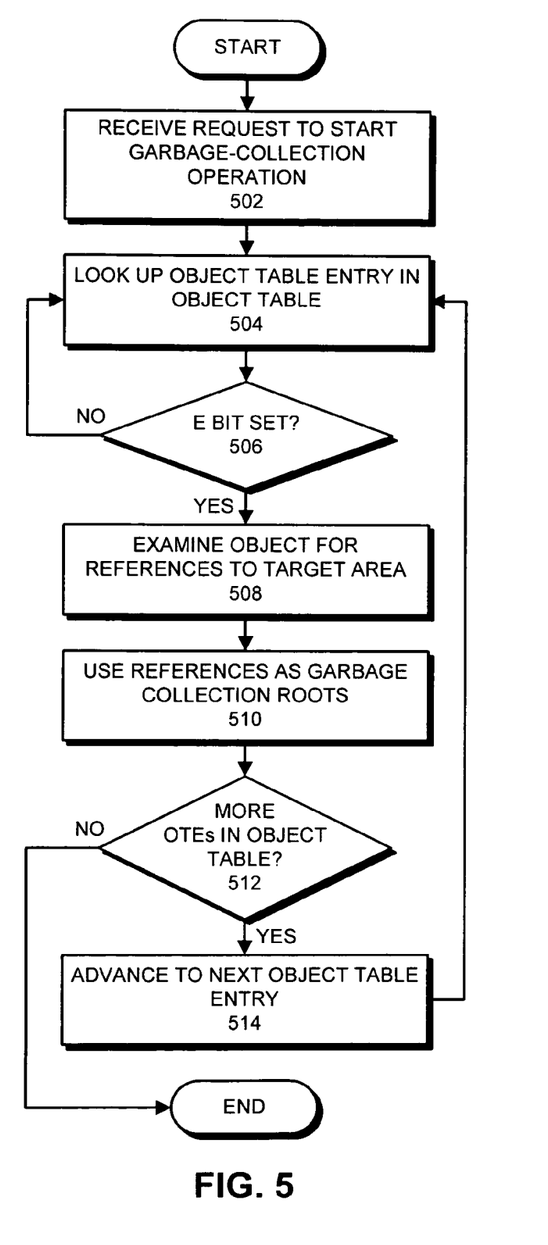
FIG. 5 presents a flow chart illustrating the process of performing a garbage-collection operation in accordance with an embodiment of the present invention.

FIG. 5 presents a flow chart illustrating the process of performing a garbage-collection operation in accordance with an embodiment of the present invention. As was previously mentioned, existing garbage collection techniques use a card table to keep track of objects that have been modified. However, as noted before, using a card table requires an additional store operation to update the card table for each store to the object heap. In contrast, the present invention eliminates the need to maintain the card table by using the evicted bit (such as evicted bit 201 in object table 109) to keep track of objects that have been modified in main memory 110. As object cache lines are written back to main memory 110, they are flushed from the object cache, and their corresponding evicted bit is set. Thus, the garbage-collection operation only needs to be concerned with tracing down references from objects with a set evicted bit. In doing so, special circumstances need to be considered. (This is explained below with reference to FIG. 6.)

The system starts by receiving a request to start a garbage-collection operation (step 502). In response to this request, the system looks up an object table entry in object table 109 (step 504), wherein the object table entry contains an evicted bit that is set whenever any part of the corresponding object is evicted from the object cache. Next, the system determines if the evicted bit is set (step 506). If not, the system returns back to step 504 and examines another object table entry in object table 109. If the evicted bit is set, the system examines the object corresponding to the object table entry to identify any references that point to the target area in the object heap that is being garbage collected (step 508). If such references are found, the system uses these references as roots for the garbage-collection operation (step 510). The system then determines if there are more object table entries in object table 109 (step 512). If so, the system advances to the next object table entry (step 514) by returning to step 504.

Note that set evicted bits will propagate up the tree of object table objects. This is a consequence of the way in which evicted bits are set. Referring to object table 109 illustrated in FIG. 3, as object 301 is evicted from the object cache, its corresponding evicted bit in its object table entry in object table object 305 is set, if it was not already set. This modifies the object table entry 305; should it later be evicted, then the evicted bit in object table table object 308 will be set, and so forth.

The system proceeds up the tree setting evicted bits, as necessary, until the root node is reached. Therefore, for subsequent garbage-collection operations, the garbage-collection mechanism can start at the root of the object table hierarchy in object table 109 and only needs to trace down branches with set evicted bits until all the object table entries with set evicted bits are found. This eliminates the need to scan through all of the object table entries and allows the garbage-collection mechanism to quickly find the objects that have been modified in main memory.

Maintaining Updated Evicted Bits

Figure 6:
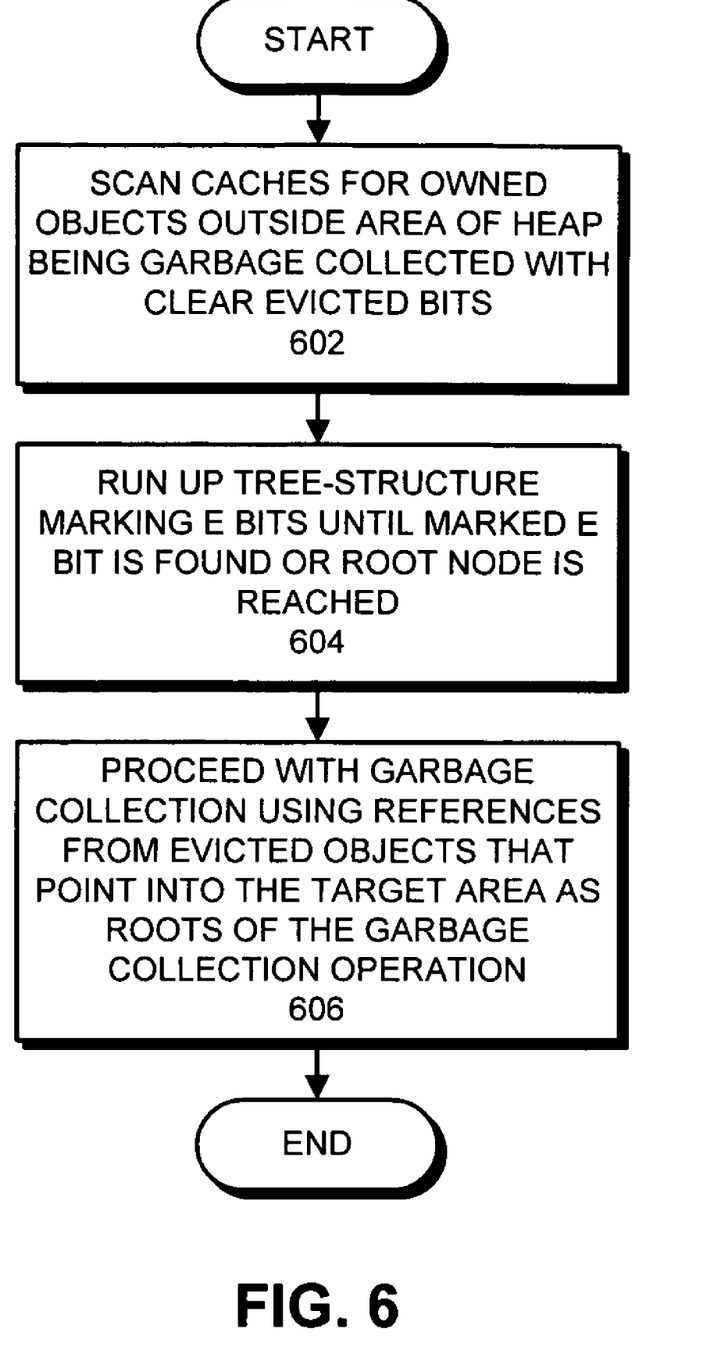
FIG. 6 presents a flow chart illustrating the process of updating evicted bits within the object cache in accordance with an embodiment of the present invention.

FIG. 6 presents a flow chart illustrating the process of updating evicted bits within the object cache in accordance with an embodiment of the present invention. Note that when evicted bits are set, they remain set during subsequent garbage collections, unless they are explicitly cleared. Consequently, the garbage-collection mechanism can perform multiple garbage-collection operations and be assured that the evicted bit remains set for objects that have been modified in main memory. However, because of the way object cache lines are updated, at the time the garbage-collection operation starts, not all evicted bits may be properly set. Hence, the system must somehow ensure coherency between the evicted bits and objects that have been modified in main memory.

One possible method to ensure coherency is to flush all modified cache lines to main memory. This causes all of the evicted bits to be set for all of the modified objects in the object cache. This, however, is an extremely time-consuming operation.

Another way to ensure coherency is to scan the caches for owned object cache lines that are not in the area of the heap being garbage collected and whose object table entries have a clear evicted bit (step 602). Next, for each such cache line, the system sets the evicted bit for the object in its object table entry, and runs up the object table tree-structure setting the corresponding evicted bits until an already set evicted bit is found, or until the root node is reached (step 604). Finally, the system proceeds with its garbage-collection operation (step 606). This involves using references from the modified objects that point into the target area as roots of the garbage-collection operation.

Note that instead of setting evicted bits for owned objects with clear evicted bits, the system can immediately perform the garbage-collection operation using references from the objects that point into the target area as garbage-collection roots.

In one embodiment of the present invention, in order to facilitate faster subsequent garbage-collection operations, the system clears the evicted bit for an object when it determines that the object does not contain any references into the target area that is being garbage collected.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying roots for a garbage-collection operation in a computer system that supports an object-addressed memory hierarchy, comprising:

looking up an object table entry that corresponds to an object in an object cache, wherein the object table entry contains an evicted bit, which is set when any part of the corresponding object is evicted from the object cache, and a corresponding physical address in main memory for the object, and wherein the object table entry is located within an object table object that is part of a hierarchical object table;

determining that the evicted bit is set for the object; and examining the object to determine if the object contains references to a target area in an object heap that is being garbage collected, and if so, using the references as roots for a subsequent garbage-collection operation of the target area.

2. The method of claim 1, wherein prior to the garbage-collection operation, the method further comprises:

receiving a request from a processor at a translator (that translates object identifiers and offsets into corresponding physical addresses) to evict an object cache line owned by the processor, wherein the object cache line includes at least a portion of the object;

retrieving the object table entry associated with the object from a translation cache;

storing the object cache line at a location determined from the physical address in the object table entry; and setting the evicted bit in the object table entry.

3. The method of claim 1, wherein each object table object in the hierarchical object table has a corresponding object table entry in a higher-level object table object until a root object table is reached, whereby the hierarchical object table forms a tree-structure.

4. The method of claim 3, wherein looking up the object table entry involves looking up the object table entry in the hierarchical object table tree-structure.

5. The method of claim 1, wherein if the evicted bit is set and the object does not contain references to the target area that is being garbage collected, the method further comprises clearing the evicted bit; and wherein if the evicted bit is set and the object does contain references to the target area, the method further comprises leaving the evicted bit set.

6. The method of claim 1, further comprising flushing the object cache and the translation cache to ensure that evicted bits are properly set prior to identifying roots for the garbage-collection operation.

7. The method of claim 1, wherein prior to identifying roots for the garbage-collection operations, the method further comprises:

scanning the object cache for owned objects in an area in the object heap that is not being garbage collected and that have a clear evicted bit; and setting the evicted bit for such owned objects.

8. The method of claim 7, wherein setting the evicted bit involves setting each corresponding evicted bit moving up a hierarchical object table tree-structure until an evicted bit is already set, or until a root object table is reached.

9. The method of claim 1, further comprising:

scanning the object cache for owned objects in an area in the object heap that is not being garbage collected and that have a clear evicted bit;

determining if any owned object contains one or more references to the target area that is being garbage collected; and if so:

setting the evicted bit for the owned object, and immediately using the one or more references as roots for a garbage-collection operation.

10. A computer-readable storage medium storing instructions that when executed by a computer cause the computer to perform a method for identifying roots for a garbage-collection operation in a computer system that supports an object-addressed memory hierarchy, the method comprising:

looking up an object table entry that corresponds to an object in an object cache, wherein the object table entry contains an evicted bit, which is set when any part of the corresponding object is evicted from the object cache, and a corresponding physical address in main memory for the object, and wherein the object table entry is located within an object table object that is part of a hierarchical object table;

determining that the evicted bit is set for the object; and     examining the object to determine if the object contains references to a target area in an object heap that is being garbage collected, and if so, using the references as roots for a subsequent garbage-collection operation of the target area.

11. The computer-readable storage medium of claim 10, wherein prior to the garbage-collection operation, the method further comprises:

receiving a request from a processor at a translator (that translates object identifiers and offsets into corresponding physical addresses) to evict an object cache line owned by the processor, wherein the object cache line includes at least a portion of the object;

retrieving the object table entry associated with the object from a translation cache;

storing the object cache line at a location determined from the physical address in the object table entry; and     setting the evicted bit in the object table entry.

12. The computer-readable storage medium of claim 10, wherein each object table object in the hierarchical object table has a corresponding object table entry in a higher-level object table object until a root object table is reached, whereby the hierarchical object table forms a tree-structure.

13. The computer-readable storage medium of claim 12, wherein looking up the object table entry involves looking up the object table entry in the hierarchical object table tree-structure.

14. The computer-readable storage medium of claim 10, wherein if the evicted bit is set and the object does not contain references to the target area that is being garbage collected, the method further comprises clearing the evicted bit; and     wherein if the evicted bit is set and the object does contain references to the target area, the method further comprises leaving the evicted bit set.

15. The computer-readable storage medium of claim 10, wherein the method further comprises flushing the object cache and the translation cache to ensure that evicted bits are properly set prior to identifying roots for the garbage-collection operation.

16. The computer-readable storage medium of claim 10, wherein prior to identifying roots for the garbage-collection operations, the method further comprises:

scanning the object cache for owned objects in an area in the object heap that is not being garbage collected and that have a clear evicted bit; and     setting the evicted bit for such owned objects.

17. The computer-readable storage medium of claim 16, wherein setting the evicted bit involves setting each corresponding evicted bit moving up a hierarchical object table tree-structure until an evicted bit is already set, or until a root object table is reached.

18. The computer-readable storage medium of claim 10, wherein the method further comprises:

scanning the object cache for owned objects in an area in the object heap that is not being garbage collected and that have a clear evicted bit;

determining if any owned object contains one or more references to the target area that is being garbage collected; and     if so:

setting the evicted bit for the owned object, and         immediately using the one or more references as roots for a garbage-collection operation.

19. An apparatus that identifies roots for a garbage-collection operation in a computer system that supports an object-addressed memory hierarchy, comprising:

a lookup mechanism configured to lookup an object table entry that corresponds to an object in an object cache, wherein the object table entry contains an evicted bit, which is set whenever any part of the corresponding object is evicted from the object cache, and a corresponding physical address in main memory for the object, and wherein the object table entry is located within an object table object that is part of a hierarchical object table;

a determination mechanism configured to determine that the evicted bit is set for the object; and     an examination mechanism configured to examine the object pointed to by the physical address in the object table entry to determine if the object contains references to a target area in an object heap that is being garbage collected, and if so, to use the references as roots for a subsequent garbage-collection operation of the target area.

20. The apparatus of claim 19, further comprising:

a receiving mechanism configured to receive a request from a processor at a translator (that translates object identifiers and offsets into corresponding physical addresses) to evict an object cache line owned by the processor, wherein the object cache line includes at least a portion of the object;

a retrieval mechanism configured to retrieve the object table entry associated with the object from a translation cache;

a storing mechanism configured to store the object cache line at a location determined from the physical address in the object table entry; and     a setting mechanism configured to set the evicted bit in the object table entry.

21. The apparatus of claim 19, wherein each object table object in the hierarchical object table has a corresponding object table entry in a higher-level object table object until a root object table is reached, whereby the hierarchical object table forms a tree-structure.

22. The apparatus of claim 21, wherein the lookup mechanism is further configured to lookup the object table entry in the hierarchical object table tree-structure.

23. The apparatus of claim 19, further comprising:

a clearing mechanism configured to clear the evicted bit if the evicted bit is set and the object does not contain references to the target area that is being garbage collected; and     wherein the clearing mechanism is further configured to leave the evicted bit set if the evicted bit is set and the object does contain references to the target area.

24. The apparatus of claim 19, further comprising a flushing mechanism configured to flush the object cache and the translation cache to ensure that evicted bits are properly set prior to identifying roots for the garbage-collection operation.

25. The apparatus of claim 19, further comprising:
a scanning mechanism configured to scan the object cache for owned objects in an area in the object heap that is not being garbage collected and that have a clear evicted bit; and
a setting mechanism configured to set the evicted bit for such owned objects.

26. The apparatus of claim 25, wherein the setting mechanism is further configured to set each corresponding evicted bit moving up a hierarchical object table tree-structure until an evicted bit is already set, or until a root object table is reached.

27. The apparatus of claim 19, further comprising:
a scanning mechanism configured to scan the object cache for owned objects in an area in the object heap that is not being garbage collected and that have a clear evicted bit;
an ownership mechanism configured to determine if any owned object contains one or more references to the target area that is being garbage collected; and
a setting mechanism configured to set the evicted bit for the owned object, and use the one or more references as roots for a garbage-collection operation if an owned object contains one or more references to the target area.

* * * * *